United States Patent
Yamagata et al.

(10) Patent No.: US 6,542,603 B1
(45) Date of Patent: Apr. 1, 2003

(54) TELEPHONE ANSWERING UNIT WITH CALLER ID AND VARIABLE RING SOUNDS

(75) Inventors: Masato Yamagata, Kanagawa (JP); Mikiharu Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/161,617

(22) Filed: Sep. 28, 1998

(30) Foreign Application Priority Data

Sep. 29, 1997 (JP) ............................................. 9-264487

(51) Int. Cl.[7] ................................................ H04M 1/00
(52) U.S. Cl. ................................ 379/373.01; 379/88.11; 379/88.19; 379/374.02
(58) Field of Search .......................... 379/88.21, 88.11, 379/142, 199, 88.22, 88.26, 88.27, 142.06, 911, 352, 354, 355.01, 357.02, 372, 373.01, 373.02, 373.03, 373.04, 373.05, 374.01, 374.02, 375.01

(56) References Cited

U.S. PATENT DOCUMENTS

| 5,202,917 A | * | 4/1993 | Wakai | 379/217.01 |
|---|---|---|---|---|
| 5,453,933 A | | 9/1995 | Wright et al. | 700/181 |
| 5,524,140 A | * | 6/1996 | Klausner et al. | 379/88.11 |
| 5,661,788 A | * | 8/1997 | Chin | 379/142.01 |
| 5,745,562 A | * | 4/1998 | Penning | 379/215.01 |
| 5,802,148 A | * | 9/1998 | Sizer, II | 379/88.19 |
| 5,841,838 A | * | 11/1998 | Itoh et al. | 379/88.21 |
| 5,903,628 A | * | 5/1999 | Brennan | 379/88.21 |
| 6,002,761 A | * | 12/1999 | Sremac | 379/88.12 |
| 6,067,355 A | * | 5/2000 | Lim et al. | 379/142.14 |
| 6,072,859 A | * | 6/2000 | Kong | 379/88.16 |

FOREIGN PATENT DOCUMENTS

EP 0588445 3/1994

* cited by examiner

Primary Examiner—Fan Tsang
Assistant Examiner—Ovidio Escalante
(74) Attorney, Agent, or Firm—Jay H. Maioli

(57) ABSTRACT

A telephone display unit in which by rotating a dial reception data histories are sequentially displayed and if a name corresponding to a telephone number has been registered, the name is displayed. If a name is not registered, a telephone number is displayed. In case of a reception in which a message has been recorded, the display unit showing the presence of the message is lit and this fact is notified. By selecting a necessary message by the dial and pressing a switch constructed integratedly with the dial, the selected message is directly reproduced. Only the necessary message can be reproduced without reproducing unnecessary messages or the reception in which no message is recorded.

4 Claims, 11 Drawing Sheets

Fig. 4

| DATE/TIME | TEL NO. OR NAME | PRESENCE OR ABSENCE OF RECORDED MESSAGE |
|---|---|---|
| NOV. 28  8:15 | XX-XXXX-XX | ABSENCE |
| NOV. 28  11:20 | JOHN SMITH | PRESENCE |
| ⋮ | ⋮ | ⋮ |
| NOV. 15  20:30 | TOM WHITE | PRESENCE |

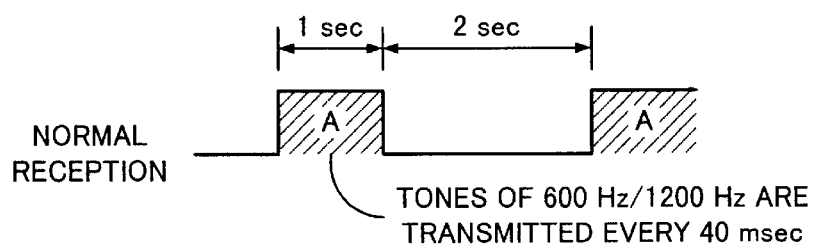
Fig. 8A NORMAL RECEPTION
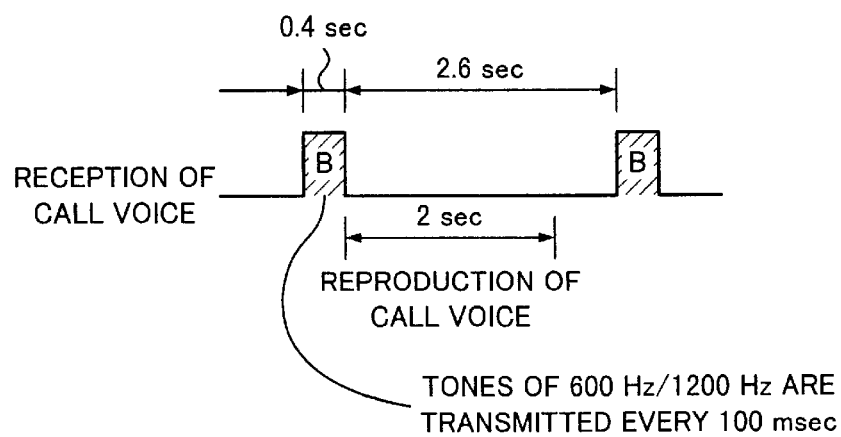
Fig. 8B RECEPTION OF CALL VOICE

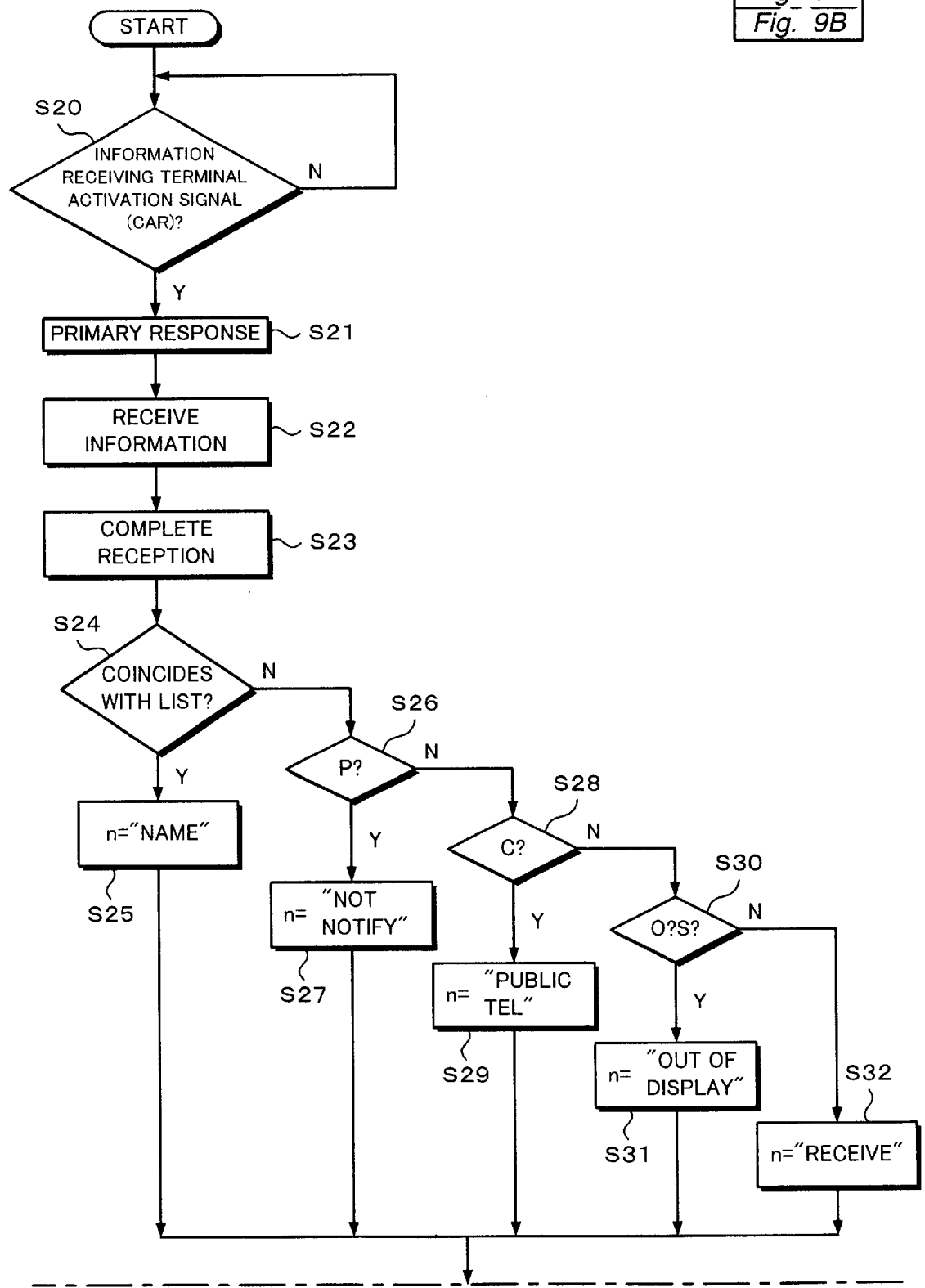

Fig. 10A

| R | E | C | E | P | T | I | O | N | | D | A | T | A | | | | | | | | | | |
| - | - | - | - | - | - | - | - | - | - | - | - | - | - | - | - | - | - | - | - | - | - | - | - |
| | | | | | | | | | | D | U | R | I | N | G | | R | E | C | E | P | T | I | O | N |

Fig. 10B

| | | | | | | | | | | M | A | Y | | 2 | 3 | | 1 | 7 | : | 2 | 5 |
| - | - | - | - | - | - | - | - | - | - | - | - | - | - | - | - | - | - | - | - | - | - |
| | | | | | | | | | | | | | | 0 | 3 | 3 | 4 | 5 | 8 | 7 | 7 | 7 | 1 |

Fig. 10C

| | | | | | | | | | | | | | | | | | | | | | 0 | 3 |
| - | - | - | - | - | - | - | - | - | - | - | - | - | - | - | - | - | - | - | - | - | - | - |
| | | | | | | | 3 | 4 | 5 | 8 | 7 | 7 | 7 | 1 | 1 | 2 | 3 | 4 |

Fig. 10D

| | | | | | | | | | | M | A | Y | | 2 | 3 | | 1 | 7 | : | 2 | 5 |
| - | - | - | - | - | - | - | - | - | - | - | - | - | - | - | - | - | - | - | - | - | - |
| J | O | H | N | | S | M | I | T | H | | | | | | | | | | | | |

Fig. 10E

| | | | | | | | | | | M | A | Y | | 2 | 3 | | 1 | 7 | : | 2 | 5 |
| - | - | - | - | - | - | - | - | - | - | - | - | - | - | - | - | - | - | - | - | - | - |
| | | | | | | | | | | | N | O | T | | N | O | T | I | F | Y |

Fig. 10F

| | | | | | | | | | | M | A | Y | | 2 | 3 | | 1 | 7 | : | 2 | 5 |
| - | - | - | - | - | - | - | - | - | - | - | - | - | - | - | - | - | - | - | - | - | - |
| | | | | | | | | | | | P | U | B | L | I | C | | T | E | L |

Fig. 10G

| | | | | | | | | | | M | A | Y | | 2 | 3 | | 1 | 7 | : | 2 | 5 |
| - | - | - | - | - | - | - | - | - | - | - | - | - | - | - | - | - | - | - | - | - | - |
| | | | | | | | | | O | U | T | | O | F | | D | I | S | P | L | A | Y |

Fig. 10H

| | | | | | | | | | | M | A | Y | | 2 | 3 | | 1 | 7 | : | 2 | 5 |
| - | - | - | - | - | - | - | - | - | - | - | - | - | - | - | - | - | - | - | - | - | - |
| | | | | | | | | | | | | R | E | C | E | I | V | E | D |

TELEPHONE ANSWERING UNIT WITH CALLER ID AND VARIABLE RING SOUNDS

BACKGROUND OF THE INVENTION

1. Field of the Invention

The invention relates to a telephone apparatus with an answering function which can receive a notification of a telephone number of a transmitting line.

2. Description of the Related Art

A telephone apparatus with an answering function such that when there is a phone call during the absence, a message of a caller is automatically recorded on the basis of a predetermined procedure, what is called an answering telephone apparatus (answer-phone), has generally been widespread for a long time. Such an answer-phone has a recording medium such as cassette tape or semiconductor memory and can record a voice message of a phone call during the absence into the recording medium.

The user (called hereinafter user A) of such an answer-phone preliminarily registers a message, for example, to promote the recording of a message in response to a phone call during the absence into the answer-phone. The user B who called the user A when the user A is absent speaks a message in accordance with the message reproduced from the answer-phone. Thus, the message is recorded to the answer-phone of the user A. The user A can reproduce the message later and can know what kind of phone call has been made during the absence.

On the other hand, as a service which is provided by a telephone enterprise, a transmission telephone number display service such that a telephone number of a person who called a telephone subscriber is notified and displayed to communicating equipment such as a telephone or the like before response has been embodied. For example, this service has already been put into practical use as "Caller ID" in U.S.A. and has also been performed as "Number Display" in Japan by a system different from that of the Caller ID.

According to the transmission telephone number display service performed as a Number Display in Japan, when there is a reception to a subscriber (hereinafter, referred to as a contractor) who has preliminarily made a contract to receive such a service, information of a telephone number of a transmitting line is transmitted to a terminal apparatus such as a telephone or the like through a contract line before communication. The transmission of the telephone number information is performed by a modem signal. By a telephone which has been prepared on the contractor side and has a modem function and corresponds to the transmission telephone number display service, the received signal is demodulated and decoded, so that the telephone number information of the transmitting line is derived. The derived telephone number information is displayed to predetermined display means provided for the telephone.

On the other hand, the foregoing answer-phone, hitherto, has a problem such that when a plurality of messages have been registered, the messages have to be reproduced one by one from the first message.

Even in the case where the transmitter hangs up in silence, the answer-phone records a silent state as a single message. The conventional answer-phone has a problem such that when a voice message is reproduced, unless the silent state is reproduced, the next message cannot be reproduced.

OBJECTS AND SUMMARY OF THE INVENTION

It is, therefore, an object of the invention to provide a telephone apparatus with an answering function in which a necessary message can be promptly reproduced and a transmission telephone number display service is effectively used.

According to the invention, there is provided a telephone apparatus with an answering function corresponding to a transmission telephone number display service to notify of a telephone number of a transmission telephone line, comprising: a first memory for storing a voice message transmitted through the transmission telephone line in an answering function mode; a second memory for storing the notified telephone number of the transmission telephone line and data to make the voice message stored in the first memory correspond to the telephone number; and control means for allowing the telephone number and the presence or absence of the voice message stored in correspondence to the telephone number to be displayed by display means in accordance with the data in the second memory.

As mentioned above, according to the invention, whether a speech has been stored for the telephone number of the transmission line or not is collated by collating means, and the display means for displaying the presence of the speech when the speech has been stored is provided, so that a necessary message can be promptly found.

The above and other objects and features of the present invention will become apparent from the following detailed description and the appended claims with reference to the accompanying drawings.

BRIEF DESCRIPTION OF THE DRAWINGS

FIG. 4 is a schematic diagram showing an example of a method of storing reception data into a memory;

FIGS. 8A and 8B are schematic diagrams for explaining two kinds of wobble tones;

FIGS. 9A and 9B are flowcharts showing processes upon reception by the answer-phone; and FIGS. 10A to 10H are schematic diagrams for explaining a display upon reception.

DETAILED DESCRIPTION OF THE PREFERRED EMBODIMENTS

Figure 1:
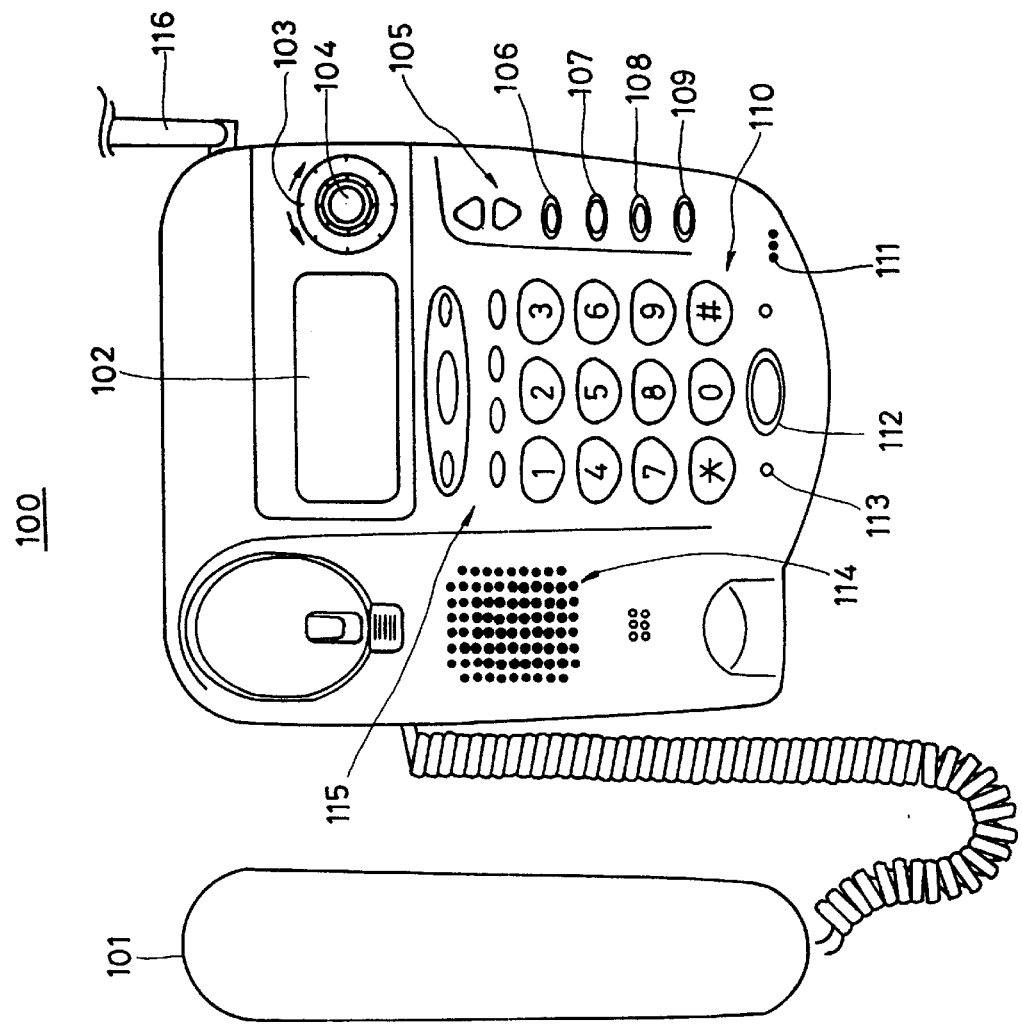
FIG. 1 is an external view of an example of an answer-phone to which the invention is applied.

An embodiment of the invention will now be described hereinbelow with reference to the drawings. FIG. 1 shows an external view of an example of an answering telephone apparatus (hereinafter, simply referred to as an answer-phone) 100 to which the invention is applied. The answer-phone 100 is made correspond to the transmission telephone number display service described in the prior art and has various display and operating units for this purpose.

Although the details will be explained hereinlater, the answer-phone 100 can form a list of telephone numbers and can register the telephone numbers and names in correspondence to each other. Wobble tones by voices can be recorded and registered in response to the telephone numbers in which the names have been registered. For the reception from a registered caller (transmission telephone number), it is possible to call by using both of the registered call voice and a beep sound (wobble tone). Further, as a function of the answer-phone, a history of the receptions during the absence corresponding to only a predetermined number of messages is stored and with respect to each reception, information indicative of the presence or absence of the recording of the voice message is displayed and, if the name coincides with the registered telephone number, the name is displayed. In accordance with the reception history, the user selects only the desired voice messages from the voice messages and can directly reproduce them.

A handset 101 is connected to the answer-phone 100. A display window 102 comprises a display unit by, for example, an LCD (Liquid Crystal Display) and a display unit by, for instance, a plurality of LEDs (Light Emitting Diodes). Various items such as operating mode of the answer-phone 100 and information by the transmission telephone number display service are displayed in the display window 102.

A dial portion 103 is provided on the right side of the display window 102. A switch portion 104 is provided in the center portion of the dial portion 103. It is more desirable to integratedly construct the switch portion 104 and dial portion 103. That is, by rotating, the dial portion 103 functions and by pushing, the switch portion 104 functions. By rotating the dial portion 103, a desired item displayed in the display window 102 is selected. By depressing the switch portion 104, this selection is determined. By further pressing the switch portion 104, the function or the display in the display window 102 can be switched.

One set of buttons 105 are volume control buttons. Buttons 106 to 109 are function buttons. In the normal transmission/reception, the button 106 is a button to perform an extension speech. The button 107 is a re-dial button to re-dial the telephone number which was pushed just before. The button 109 is a button to hold the speech. At the time of the registration of reception data, the button 107 is used to register the telephone number which needs waiting time and the button 109 is used to erase the registered contents. The button 108 is used when specifying the registered contents in the registering operation.

Dial buttons 110 comprising a plurality of buttons, namely, a symbol button "#" and "*" and numeral buttons "0" to "9" are provided in the center portion of the answer-phone 100. A microphone 111 is used when a voice message is recorded. By pressing a speaker phone button 112, a speech communication can be performed by using a speaker 114 and the microphone 111 without using the handset 101. A speech/reception lamp 113 is lit on during the speech communication or reception. The speaker 114 is used when a speech communication by the speaker phone is performed and, at the same time, a wobble tone is generated. An antenna 116 is provided to communicate with a slave phone (not shown).

Function buttons 115 to make operative the answering telephone function and the function by the transmission telephone number display service are provided in the portion below the display window 102. Buttons arranged at the upper stage are a play/stop button, an answering button, and a transfer button from the left side. Buttons arranged at the lower stage are a non-notify button, a speech refusal button, a reception data button, and a speech record button from the left.

The play/stop button is used to reproduce the messages recorded during the absence and to stop the reproduction. By pressing the answering button, the answering telephone function is activated and the recording of a voice message or the like can be performed. By pressing the transfer button, for example, before the user goes out, the recorded messages are transferred to a going-out destination which has preliminarily registered as a transfer destination. By again pressing the transfer button, the transfer state is cancelled.

By pressing the non-notify button upon dialing, it is possible to prevent the user's own telephone number from being displayed to the caller destination. In the transmission telephone number display service, by dialing a specific number, for example, "184" prior to the telephone number, it is possible to prevent the user's own telephone number from being displayed to the caller destination. The non-notify button is used to automatically perform such an operation. The speech refusal button is a button to refuse a speech communication with the received caller. By pressing the speech refusal button during the ringing of the wobble tone or during the speech communication, a message to notify the caller of the refusal of the speech communication is transmitted and the line is disconnected. By pressing the reception data button, the reception data is displayed in the display window 102 and the operating mode is shifted to the mode for processing the reception data. By pressing the speech record button during the speech communication, the speech contents are recorded.

Figure 2:
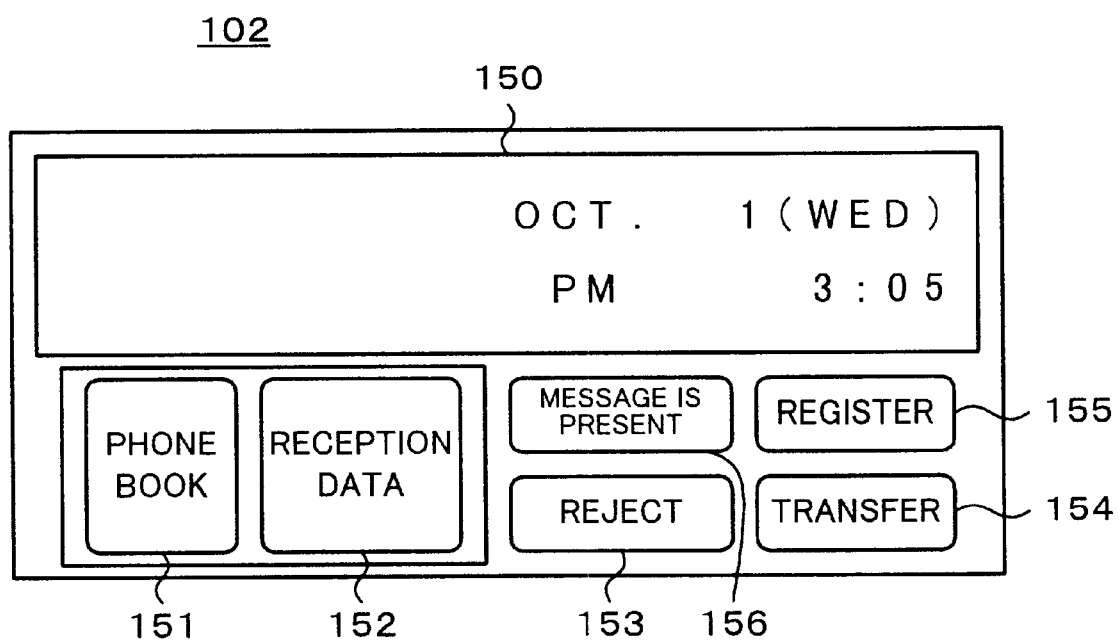
FIG. 2 is a schematic diagram showing an example of a display window.

FIG. 2 shows an example of the display window 102. The upper stage is a data display unit 150 and is made up of, for example, an LCD. A display area of two lines each comprising 24 characters is provided. An alphanumeric character and a symbol can be displayed as one character. The data display unit 150 has a plurality of display modes. In correspondence to the state of the answer-phone 100, for example, the present date and time, the telephone number which is being dialed, the reception data, rough speech time, a telephone charge, and the registered contents of the telephone number list are displayed to the data display unit 150.

The lower stage is light-on/off displayed by using, for instance, an LED. A display unit 151 is lit in case of using the telephone number list function. A display unit 152 is lit in case of displaying the reception data by the transmission telephone number display service. A display unit 153 is lit in case of using a speech refusing function based on the transmission telephone number display service. A display unit 154 is lit when the transfer mode is set by pressing the transfer button among the function buttons 115. A display unit 155 is lit during the registering operation. A display unit 156 is lit in the case where the reception data is displayed in the display unit 150 and a message has been recorded in response to the reception data.

Figure 3:
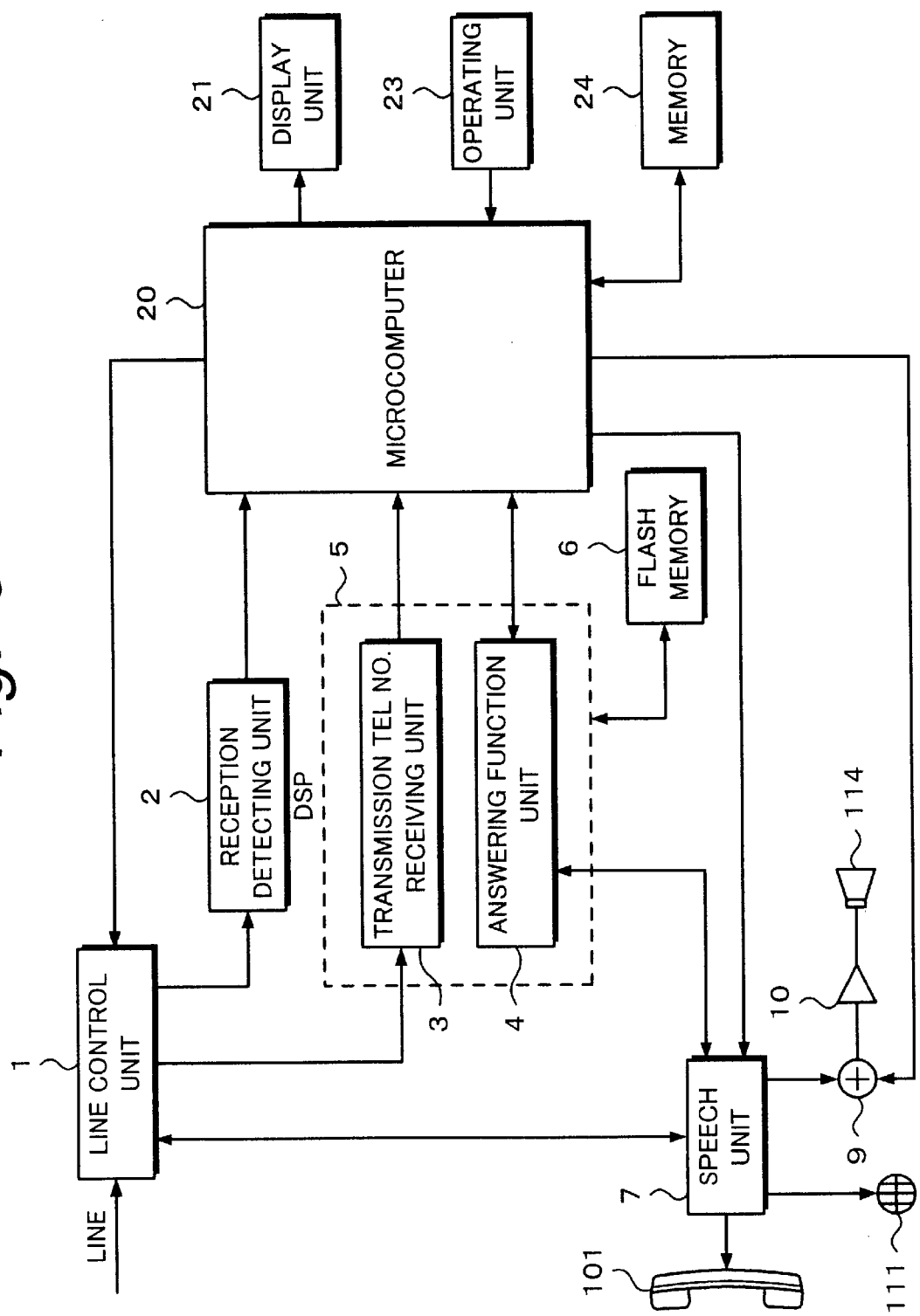
FIG. 3 is a block diagram showing an example of a construction of the answer-phone.

FIG. 3 shows an example of a construction of the answer-phone 100. A microcomputer 20 is constructed by, for example, a microcomputer of one chip and controls the operation of the whole answer-phone 100. A memory 24 is connected to the microcomputer 20. An operating unit 23 represents the foregoing dial portion 103, switch portion 104, and buttons 105 to 110, 112, and 115 and generates a signal corresponding to the operation of each of them. The microcomputer 20 forms a control signal according to an output of the operating unit 23. A display control signal formed in the microcomputer 20 is supplied to a display unit 21. The display unit 21 corresponds to the foregoing display window 102 and displays various contents on the basis of the supplied display control signal.

A telephone line is connected to a line control unit 1. The line control unit 1 controls a line connection between a subscriber's line exchange of a telephone station and the answer-phone 100. The line control unit always monitors the lines when no line is connected. In the lines, when the polarity inversion of lines L1 and L2 is detected and an information receiving terminal activation signal (CAR) is received, the line control unit 1 returns a primary response signal by a DC loop between the lines L1 and L2 to the subscriber's line exchange.

Transmission telephone number information is sent as a modem signal from the subscriber's line exchange which received the primary response signal. The modem signal has a format according to the ITU-T recommendation V.23 and is modulated by a frequency modulating system and is transmitted at a data rate of 1200 bps. Information for the other services is also included in the modem signal.

The modem signal is supplied from the line control unit 1 to a transmission telephone number receiving unit 3. The transmission telephone number receiving unit 3 demodulates the supplied modem signal and extracts transmission telephone number information. The extracted transmission telephone number information is supplied to the microcomputer 20 and is written as reception data into the memory 24. The reception data of a predetermined number of messages, for example, 20 messages are stored as a reception history into the memory 24. The transmission telephone number receiving unit 3 is constructed by a DSP (Digital Signal Processor) 5 together with an answering function unit 4, which will be explained hereinlater.

The transmission telephone number information is information showing the transmission telephone number, namely, the telephone number of the calling party on the transmission line. In a manner similar to the normal telephone number, the transmission telephone number is constructed by an area code, a local code, and a subscriber's number. In this service, on the transmitter side, for example, by dialing "184" prior to the telephone number, a mode such that the subscriber's own telephone number is not notified (non-notify) can be selected. In this case, "P" is sent as a transmission telephone number. In the case where the telephone number cannot be notified because of a reason in which the details are obscure, "O" is sent as a transmission telephone number. In the case where the telephone number cannot be notified because of a transmission from a public telephone, "C" is sent as a transmission telephone number. In the case where the telephone number cannot be notified between the communication enterprises, "S" is sent.

After completion of the reception of the modem signal, the loop between the lines L1 and L2 is disconnected in the line control unit 1 and a reception completion signal is sent to the subscriber's line exchange. By receiving this signal, a call signal is sent from the subscriber's line exchange. The call signal is supplied from the line control unit 1 to a reception detecting unit 2, so that the reception is detected. A fact that there is the reception is notified from the reception detecting unit 2 to the microcomputer 20.

In the microcomputer 20, a wobble tone is generated in response to such a reception notification.

The wobble tone is supplied to an amplifier 10 through an adder 9. The supplied wobble tone is amplified by the amplifier 10 and the speaker 114 is driven.

When the handset 101 is off-hook, a secondary response signal is sent from the line control unit 1 to the subscriber's line exchange. In response to this signal, the lines L1 and L2 are polarity returned and a speech communication is started.

In the line control unit 1, the public telephone line is connected to a speech unit 7. The speech unit 7 is constructed by a cross point switch which is controlled by the microcomputer 20 and connects the line control unit 1 and handset 101. Thus, a telephone communication is executed by using the handset 101.

During the operation of the answering function, for example, when a wobble tone is rung only a predetermined number of times, the speech unit 7 is controlled by the microcomputer 20 and the connection with the line control unit 1 is switched from the handset 101 to the answering function unit 4. In the answering function unit 4, an answering message stored in a flash memory 6 is preliminarily reproduced by using the microphone 111 and is sent to the communication caller through the speech unit 7 and line control unit 1. The voice message from the communication caller is supplied to the answering function unit 4 through the line control unit 1 and speech unit 7 and is stored into the flash memory 6, so that it is recorded.

The message which is recorded into the flash memory 6 is made to correspond to the storage of the transmission telephone number information for the memory 24. For instance, this process is performed by a method whereby a table showing the correspondence relation between the address in the memory 6 of the voice message recorded in the flash memory 6 and the transmission telephone number information is formed in the memory 24. The table showing the correspondence relation between them can be also provided on the flash memory 6 side.

In the answering function unit 4, a silent time of a predetermined time (for example, 6 seconds) from the recording start time is detected and the presence or absence of the recording of the voice message can be discriminated on the basis of a detection result. Information indicative of the presence or absence of the recording of the voice message is supplied to the microcomputer 20.

FIG. 4 shows an example of a storing method of reception data which is stored as a reception history into the memory 24. Reception day and time and the transmission telephone number are stored in correspondence to each other. At the same time, the information indicative of the presence or absence of the voice message recording is stored. The reception data of a predetermined number of messages, for example, 20 messages is stored in accordance with the order from the latest message.

The answer-phone 100 can form a transmission telephone number list on the basis of the stored transmission telephone number information. For example, the telephone number is inputted by a predetermined operation and the name corresponding to the telephone number is properly set and is registered as transmitter information into the list. The telephone number is inputted by, for example, the dial buttons 110. The name is inputted by using, for example, the dial portion 103 and switch portion 104. The telephone number list formed as mentioned above is stored into a predetermined area in the memory 24.

When the transmission telephone number coincides with the telephone number in which the name has been registered, as shown in the second or last line in FIG. 4, the registered name is replaced to the transmission telephone number and is recorded. Both of the name and the transmission telephone number can be also stored.

Figure 5A:
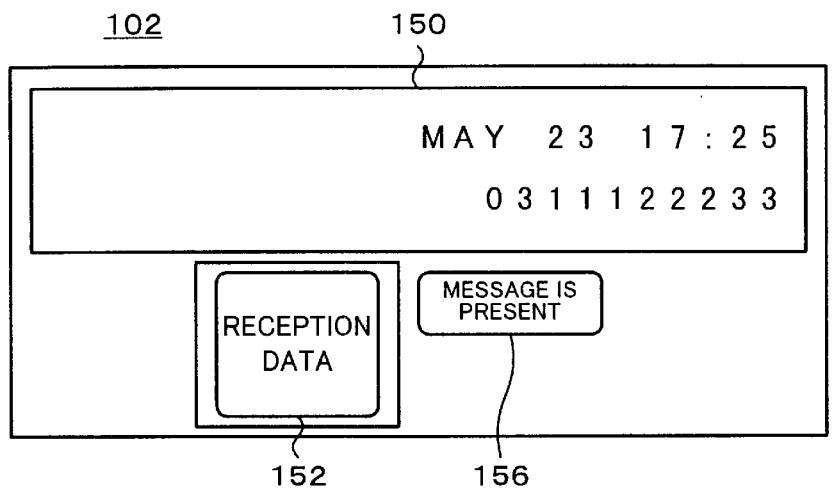
FIGS. 5A to 5C are schematic diagrams for explaining a reproducing method of a message.
Figure 5B:
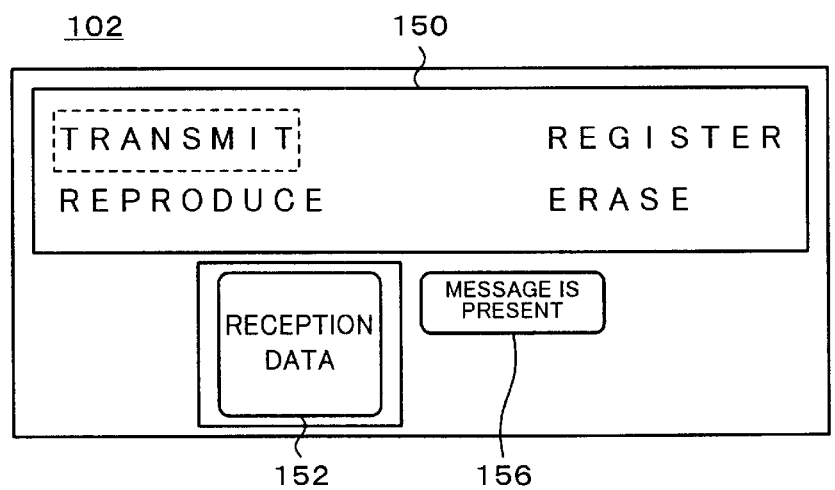
Figure 5C:
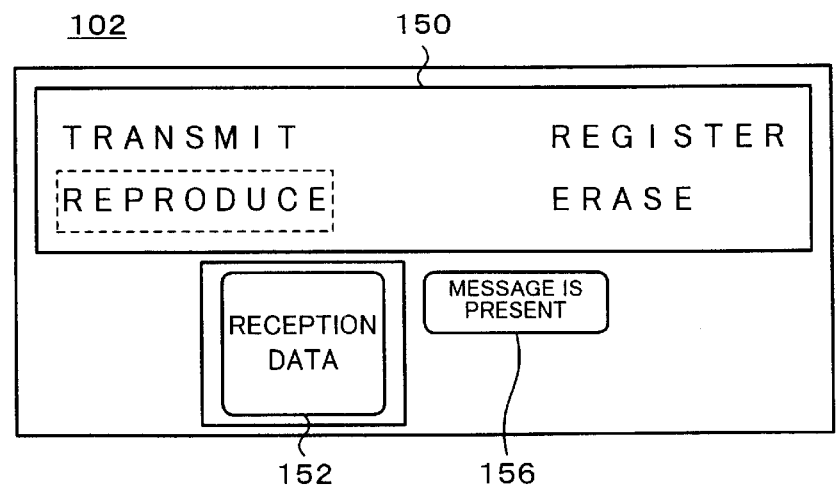

A reproducing method of the message stored in the flash memory 6 will now be described with reference to FIGS. 5A to 5C. When the reception data button is pressed, the latest reception data is read out from the memory 24 and the read-out data is displayed in the display unit 150. This state is shown in FIG. 5A. The reception day and time are displayed at the upper stage of the display unit 150 and the transmission telephone number is displayed at the lower stage. In this instance, the telephone number list stored in the predetermined area in the memory 24 is retrieved. If the name has been registered in correspondence to the telephone number, the registered name is displayed in place of the transmission telephone number.

By rotating the dial portion 103, the reception data stored in the memory 24 can be sequentially displayed for the display unit 150 from the latest data. If the displayed reception data is the message recorded data, the display unit 156 is lit on and this fact is displayed. In this instance, by pressing the switch portion 104, the display unit 150 in the display window 102 displays a menu as shown in FIG. 5B. At present, "TRANSMIT (transmission)" is selected.

By rotating the dial portion 103, the menu is selected. As shown in FIG. 5C, "REPRODUCE (reproduction)" is selected. When the switch portion 104 is pressed and the selection is determined, for example, the table which was formed in the memory 24 and shows the relation between the voice message recorded in the flash memory 6 and the transmission telephone number information is referred. Only the voice message corresponding to the reception data displayed in the display unit 150 is reproduced.

The answer-phone 100 can register a voice for each of the transmitter information registered in the telephone number list. When there is a reception of the transmission number in which the voice has been registered, the registered voice can be used as a wobble tone. In the answer-phone 100, the wobble tone is made differently in dependence on whether the transmission telephone number coincides with the telephone number of the transmitter information registered in the telephone number list or not.

The call voices are registered into the flash memory 6. Since answering messages or messages are stored in the flash memory 6, an area to register the call voices is limited. When many voice messages have been registered, the number of call voices which can be registered is reduced. In this example, the time in which one call voice can be registered is limited to two seconds. When the call voice is actually registered, it is difficult to accurately grasp the time of two seconds. In the embodiment, accordingly, this problem is solved by visually displaying the elapse of two seconds together with the recording of the voice.

Figure 6:
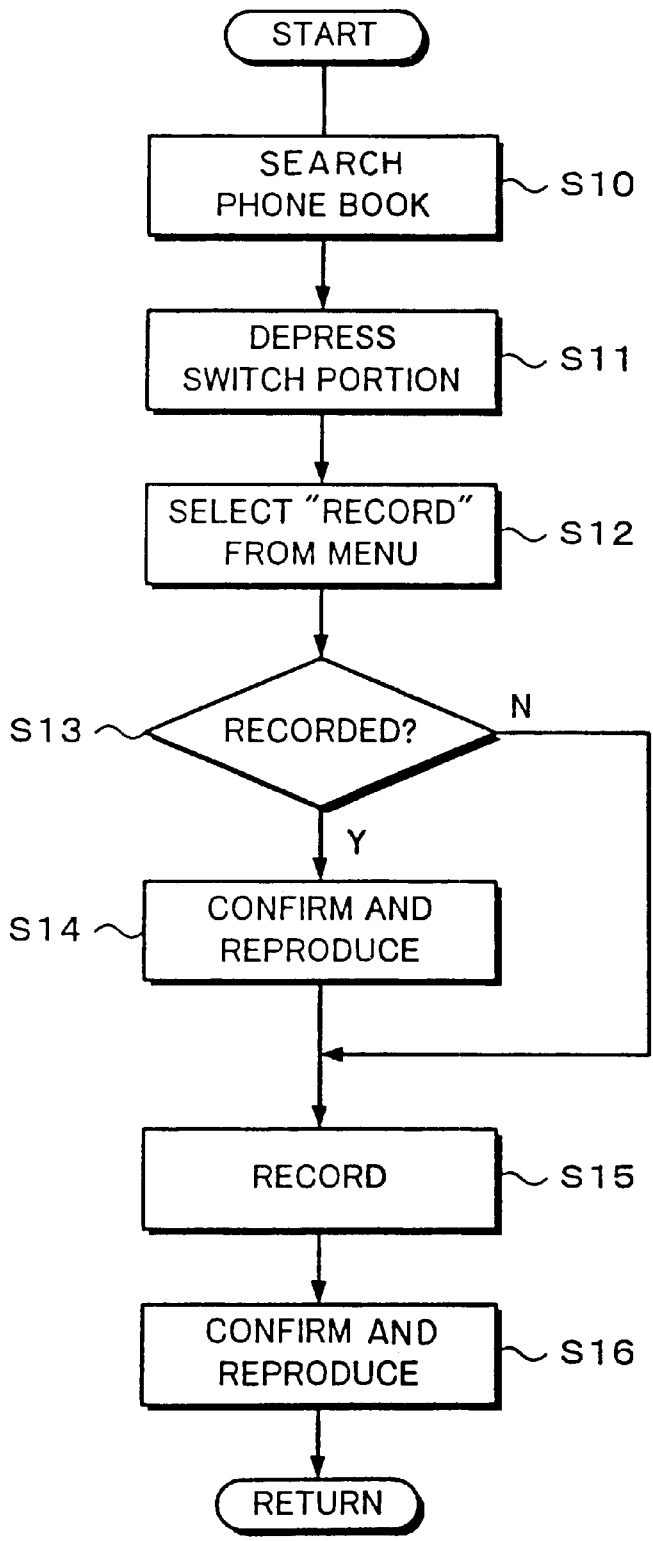
FIG. 6 is a flowchart showing an example of a procedure at the time of a registration of a calling voice.

FIG. 6 is a flowchart showing an example of a procedure when the call voices are registered. FIGS. 7A to 7E show examples of display for the display unit 150 which is executed in accordance with the flowchart. First in step S10, a phone book to register the call voices is searched. That is, by rotating the dial portion 103, the transmitter information registered in the telephone number list is sequentially displayed on the display unit 150. When the number in which the user wants to register the call voice appears, the switch portion 104 is pressed (step S11). In this instance, in the speech unit 7, the handset 101 and answering function unit 4 are connected by the control of the microcomputer 20.

When the switch portion 104 is pressed, a menu to select the process is displayed in the display unit 150. For example, in a manner similar to the examples of FIGS. 5A to 5C, "TRANSMIT (transmission)", "RECORD (recording)", "CORRECT (correction)", and "ERASE (erasure)" are displayed. By rotating the dial portion 103, "RECORD" is selected.

By pressing the switch portion 104, the selection is specified. In the case where the call voice has already been registered for the transmitter information as a target, this fact is displayed in the display unit 150. For example, a symbol "*" is added to the head of "RECORD" and "*RECORD" is displayed. However, if it is determined to be the number in which the call voice is not registered (step S13), the processing routine advances to step S15. When it is determined that the call voice has already been recorded, step S14 follows.

Figure 7A:
FIGS. 7A to 7E are schematic diagrams showing examples of a display at the time of the call voice registration.

In step S14, a reproduction for confirmation is performed for the call voice which has already been recorded. In this instance, first, as shown in FIG. 7A, the lower stage of the display unit 150 is filled with the black tile display. In this example, since 24 characters can be displayed at the lower stage, the lower stage is filled with 24 black tile displays each corresponding to one character. At the same time of the start of the reproduction of the registered call voice, the black tile displays are sequentially erased one character by one from the left to the right, namely, all of the black tile displays as many as 24 characters are erased for two seconds. After the elapse of two seconds, a confirmation sound is generated. When the confirmation reproduction is finished, the processing routine advances to step S15.

Figure 7B:
Figure 7C:
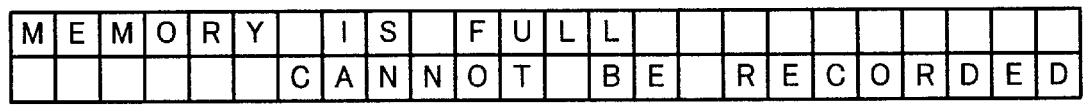
Figure 7D:
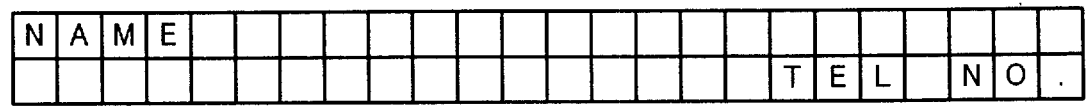

When "RECORD" is selected and specified in step S12, if the number of registration call voices exceeds a preset upper limit value, for example, if 50 call voices have already been registered, a display as shown in FIG. 7B is performed to the display unit 150 together with an error sound. Similarly, when the capacity of the flash memory 6 is full, a display as shown in FIG. 7C is performed to the display unit 150 together with the error sound in order to notify of the full memory capacity. On the other hand, when the call voice can be registered, as shown in FIG. 7D, the name set in the selected number is displayed at the upper stage and the telephone number is displayed at the lower stage.

Figure 7E:

In step S15, the recording for registration of the call voice is performed. The handset 101 is off-hooked and a transmission sound is generated after the elapse of a predetermined time. At the same time, as shown in FIG. 7E, the lower stage of the display unit 150 is filled with 24 black tile displays. After the end of the transmission sound, the black tile displays are sequentially erased one character by one from the left to the right. All of the black title displays as many as 24 characters are erased for two seconds. When a voice is inputted to the handset 101 for two seconds while the black tile displays are erased, the voice is recorded and is registered as a call voice. As mentioned above, when the call voice is recorded, since the elapsed time is displayed in the display unit 150, the residual time for which the call voice can be recorded can be easily grasped.

When the recording is finished and the handset 101 is on-hook, the processing routine is shifted to step S16. In step S16, the contents recorded just before are reproduced. The confirmation reproduction is executed substantially in the same manner as that of the reproduction of the recorded call voices described in step S14. When the confirmation reproduction is finished, the registration of one call voice is completed.

Although the invention has been described here on the assumption that the handset 101 is used upon recording of the call voice, the invention is not limited to this example. For instance, the call voice can be also recorded by using the microphone 111 and speaker 114. By pressing the speaker phone button 112, those recording methods can be also switched.

As mentioned above, in the answer-phone 100, the wobble tone in the reception in which the transmission telephone number coincides with the telephone number registered in the telephone number list is made different from that in the other reception (normal reception). FIGS. 8A and 8B show examples of two kinds of wobble tones. A period of wobble tone is set to 3 seconds for both of the two kinds of wobble tones.

FIG. 8A shows an example of a wobble tone by the normal reception. A wobble tone A of one second and a silent state of two seconds are repeated. As for the wobble tone A, tones by sine waves of frequencies of 600 Hz and 1200 Hz are repeated every 40 msec.

FIG. 8B shows an example of a wobble tone in the case where the transmission telephone number and the number in the list coincide. A wobble tone B of 0.4 second and the silent state of 2.6 seconds are repeated. As for the wobble tone B, tones by sine waves of frequencies of 600 Hz and 1200 Hz are repeated every 100 msec.

When the transmission telephone number coincides with the number in the list, if the foregoing call voice has been registered for the corresponding number, the call voice is reproduced for the silent state period of time in FIG. 8B. The corresponding call voice is read out from the flash memory 6 by the answering function unit 4 and is supplied to the adder 9 through the speech unit 7. In the adder 9, the wobble tone B supplied from the microcomputer 20 and the call voice are added and the speaker 114 is driven through the amplifier 10. The reproduction of the call voice is performed by using the end of wobble tone B as a trigger. Since there is the interval of 2.6 seconds until the next wobble tone B, after the end of the reproduction of the call voice, the silent state of at least 2.6 seconds is assured.

The combination of the frequencies of the wobble tones A and B and the continuation time of each frequency are not limited to those examples. The continuation times of the wobble tones A and B are not limited to those examples.

Figure 9B:
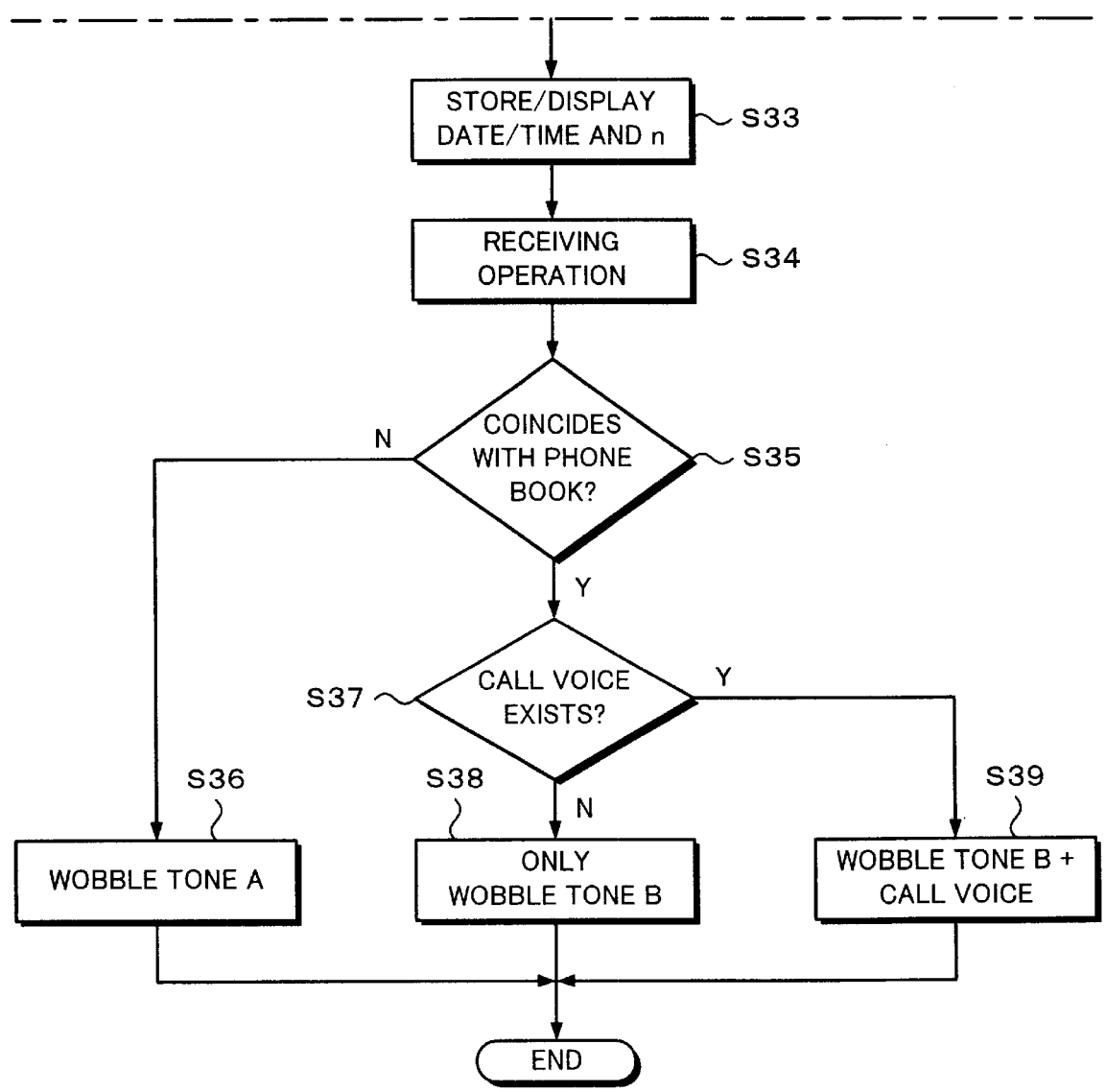

Processes upon reception by the answer-phone 100 and the display for the display unit 150 will now be described with reference to a flowchart of FIGS. 9A and 9B and FIGS. 10A to 10H. In FIGS. 9A and 9B, the answer-phone 100 waits until the information receiving terminal activation signal is sent from the subscriber's line exchange (step S20). When the signal is sent, a primary response is performed in step S21. The transmission telephone number information sent from the subscriber's line exchange is received in step S22. During the reception, a display showing that the reception data is being received is performed to the display unit 150 as shown in FIG. 10A. In step S23, the line is released and the completion of the reception is notified.

In step S24, a check is made to see if the telephone number shown by the transmission telephone number information sent in step S22 coincides with one of the telephone numbers registered in the telephone number list in the memory 24. If they coincide, in step S25, the name registered as transmitter information in the list in correspondence to the telephone number is substituted for a variable n.

When it is determined in step S24 that the telephone number does not coincide with that in the list, the processing routine advances to step S26. When the transmission telephone number information indicates "P", "NOT NOTIFY (not notified)" is substituted for the variable n in step S27. If the transmission telephone number information is not equal to "P", step S28 follows. A check is made to see if the transmission telephone number information is equal to "C". If it is "C", "PUBLIC TEL (public telephone)" is substituted for the variable n in step S29. If the transmission telephone number information is not equal to "C", step S30 follows. A check is made to see if the transmission telephone number information is equal to "O" or "S". If it is "O" or "S", "OUT OF DISPLAY (out of a display range)" is substituted for the variable n. When the transmission telephone number information is not equal to "O" or "S", it is regarded that the information could not be received. Step S32 follows and "RECEIVE (reception)" is substituted for the variable n.

When the character train is substituted for the variable n as mentioned above, in step S33, the day and time of reception and the contents of the variable n are stored into the memory 24 and are displayed for the display unit 150. The expression of "is substituted for the variable n" used in the above explanation is used for convenience of explanation.

FIGS. 10B to 10H show examples of displays of the transmission telephone number information for the display unit 150. When it is determined in step S24 that the telephone number coincides with that of the list and when the name is substituted for the variable n in step S25, as shown in FIG. 10D, the reception day and time are displayed at the upper stage and the name registered in correspondence to the telephone number is displayed at the lower stage. Similarly, examples of displays in steps S27, S29, S31, and S32 are shown in FIGS. 10E to 10H.

Although not shown in the flowchart, in step S24, when the telephone number sent as transmission telephone number information does not coincide with that in the telephone number list, the telephone number is substituted for the variable n. An example of the display is shown in FIG. 10B. In this instance, when the number of digits of the telephone number exceeds the number of display digits at the lower stage, as shown in an example of FIG. 10C, the day and time display at the upper stage is erased and the head digit overflowed in the display at the lower stage is displayed to the right at the upper stage.

When the reception day and time and the transmission telephone number information are stored in the memory 24 and are displayed in the display unit 150, the processing routine advances to step S34. The receiving operation is performed. The wobble tone is rung in step S35 and subsequent steps.

In step S35, a check is made to see if the received telephone number coincides with the telephone number registered in the telephone number list. If they do not coincide, step S36 follows and the wobble tone in the normal state, namely, the wobble tone shown in FIG. 8A is rung.

When it is decided in step S35 that the telephone number coincides with the number in the telephone number list, step S37 follows. A check is made to see if the call voice has been registered for the telephone number. When the call voice is not registered, the wobble tone shown in FIG. 8B is rung in step S38. In this instance, only the wobble tone is rung. When the call voice has been registered, in step S39, the wobble tone shown in FIG. 8B is rung together with the call voice.

According to the invention as described above, by operating the dial unit, the reception data is sequentially displayed in the display window, so that the necessary message can be searched. By pressing the switch portion when the necessary message is displayed, the message is reproduced. There is, consequently, an effect such that only the necessary message can be directly reproduced without reproducing the unnecessary messages.

The present invention is not limited to the foregoing embodiments but many modifications and variations are possible within the spirit and scope of the appended claims of the invention.

What is claimed is:

1. A telephone apparatus with an answering function and for use with a transmission telephone number display service to notify a user of a telephone number of a call received over a transmission telephone line, the apparatus comprising:

display means;

means for producing a wobble tone indicating an incoming call, wherein said wobble t one has a fixed period;

a first memory for storing a voice message transmitted through said transmission telephone line in an answering function mode;

a second memory for storing said telephone number of the call received over the transmission telephone line and for storing data to make said voice message stored in said first memory correspond to said telephone number and for storing a list of telephone numbers and corresponding names of respective callers; and control means for causing said display means to display said telephone number, corresponding name, and a presence or absence of the voice message stored in said first memory corresponding to said telephone number stored in said second memory to be displayed in accordance with said data in said second memory, for checking said telephone number against said list of telephone numbers and causing said means for producing a wobble tone to produce a first wobble tone having said fixed period in the form of a first pulse tone having a first time length followed by a predetermined first time length with a voice sound of the name of the caller produced in said predetermined first time following said first pulse tone upon finding a match and to produce a second wobble tone having said fixed period and being different than said first wobble tone in the form of a second pulse tone having a second time longer than said first time length and followed by a predetermined second time shorter than said predetermined time length and having no sound therein upon not finding a match.

2. The apparatus according to claim 1, further comprising reproducing means for selectively reproducing from said first memory the voice message stored in correspondence to said telephone number.

3. The apparatus according to claim 2, wherein a name to discriminate a telephone number of a call received over said transmission telephone line is previously stored in said second memory with respect to said telephone number and when said name has been stored said name and an indication of the presence or absence of said stored voice message corresponding to said name are displayed.

4. The apparatus according to claim 2, wherein when said voice message is stored in said first memory in said answering function mode and silent state continues for a predetermined period of time from a start of recording, said control means determines that there is no voice message.

\* \* \* \* \*